United States Patent
Shen et al.

(10) Patent No.: US 11,137,903 B2
(45) Date of Patent: Oct. 5, 2021

(54) GESTURE-BASED TRANSITIONS BETWEEN MODES FOR MIXED MODE DIGITAL BOARDS

(71) Applicant: Pathway Innovations and Technologies, Inc., San Diego, CA (US)

(72) Inventors: Ji Shen, San Diego, CA (US); FengGang Wu, San Diego, CA (US)

(73) Assignee: Pathway Innovations and Technologies, Inc, San Diego, CA (US)

( * ) Notice: Subject to any disclaimer, the term of this patent is extended or adjusted under 35 U.S.C. 154(b) by 0 days.

(21) Appl. No.: 16/831,782

(22) Filed: Mar. 26, 2020

(65) Prior Publication Data

US 2020/0264770 A1    Aug. 20, 2020

Related U.S. Application Data

(63) Continuation-in-part of application No. 16/816,156, filed on Mar. 11, 2020, and a continuation-in-part of
(Continued)

(51) Int. Cl.
*G06F 3/0488* (2013.01)
*G06F 3/0484* (2013.01)

(52) U.S. Cl.
CPC ...... *G06F 3/04883* (2013.01); *G06F 3/04845* (2013.01)

(58) Field of Classification Search
CPC .. G06F 3/04883; G06F 3/0488; G06F 3/0482; G06F 3/04842; G06F 2203/04104; G06F 2203/04806
See application file for complete search history.

(56) References Cited

U.S. PATENT DOCUMENTS 8,120,371 B2    2/2012    Day et al.
9,001,082 B1    4/2015    Rosenberg et al.
(Continued)

OTHER PUBLICATIONS

Barret et al., "Projected-Capacitive Touch Technology", Mar. 2010, published in Information Display, pp. 16-21.
(Continued)

*Primary Examiner* — Gerald Johnson
(74) *Attorney, Agent, or Firm* — Insigne PC

(57) ABSTRACT

Disclosed is a method and system for providing gesture-based transitions while using a digital whiteboard. The present disclosure relates to a method for gesture-based transitions for interacting with a digital whiteboard comprising the steps of receiving information relating to a first pointer down event; receiving information relating to a first pointer up event; comparing the information relating to the pointer down event to the information relating to the pointer up event; and transitioning from a first interactive mode to a second interactive mode based on the comparison. The present disclosure further relates to a digital whiteboard system comprising one or more processors and memory, communicatively coupled to the one or more processors, storing executable instructions that, when executed by the one or more processors, cause the one or more processors to perform acts comprising identifying a pointer down event inputted by a user; identifying a pointer up event inputted by the user; comparing the pointer down event to the pointer up event; and transitioning from a first interactive mode to a second interactive mode based on the comparison.

11 Claims, 6 Drawing Sheets

Related U.S. Application Data application No. 15/968,726, filed on May 1, 2018, now abandoned.

(60) Provisional application No. 62/824,293, filed on Mar. 26, 2019, provisional application No. 62/824,296, filed on Mar. 26, 2019, provisional application No. 62/816,863, filed on Mar. 11, 2019, provisional application No. 62/492,867, filed on May 1, 2017.

(56) References Cited

U.S. PATENT DOCUMENTS

| | | |
|---|---|---|
| 9,081,440 B2 | 7/2015 | Chang |
| 9,639,179 B2 | 5/2017 | Armstrong-Muntner |
| 2012/0287056 A1* | 11/2012 | Ibdah ............... G06F 3/04886 |
| | | 345/173 |
| 2014/0129990 A1* | 5/2014 | Xin .................. G06K 9/6201 |
| | | 715/849 |
| 2018/0183993 A1* | 6/2018 | Kobayashi ....... H04N 5/232127 |

OTHER PUBLICATIONS

Fujitsu Microelectronics Europe GBMH, "Capacitive Touch Sensors: Application Fields, technology overview and implementation example", Whitepaper, Jan. 12, 2010, 12 pages.

* cited by examiner

GESTURE-BASED TRANSITIONS BETWEEN MODES FOR MIXED MODE DIGITAL BOARDS

CROSS-REFERENCE TO RELATED APPLICATIONS

The present disclosure claims priority to U.S. Provisional Patent Application No. 62/824,293, filed on Mar. 26, 2019, and entitled, "Gesture-Based Transitions Between Modes for Mixed Mode Digital Boards;" and U.S. Provisional Patent Application No. 62/824,296 filed on Mar. 26, 2019 and entitled, "Stroke-Based Object Selection for Digital Board Applications;" and U.S. patent application Ser. No. 15/968,726, filed on May 1, 2018, and entitled, "Capacitance and Conductivity Dual Sensing Stylus-Independent Multitouch Film," which claims priority to U.S. Provisional Patent Application No. 62/492,867, filed on May 1, 2017, and entitled, "Capacitance and Conductivity Dual Sensing Stylus-Independent Multitouch Film;" and U.S. patent application Ser. No. 16/816,156 filed on Mar. 11, 2020, and entitled, "Capacitive Pressure Sensing for Paper and Multiple Writing Instruments," which claims priority to U.S. Provisional Patent Application No. 62/816,863, filed on Mar. 11, 2019, and entitled, Capacitance Sensing Apparatus for a Digital Writing Pad;" the entire disclosures of which are all incorporated herein by reference.

BACKGROUND OF INVENTION

1. Field of Invention

This invention relates to digital board user interfaces that employ touch-sensitive displays, and more specifically, to convenient mode switching in a digital board.

2. Description of Related Art

Whether a student in a classroom, a professional giving a presentation, a scholar in a conference, or any person who desires to display written information, a writing pad remains indispensable. Over centuries, the most common instruments people have used to write on paper include various writing implements such as brushes, ink quills, pens, pencils, etc.

In a digital era of rapid information distribution, it is desirable to record notes and drawings for conveniently editing, sharing, and archiving. For at least these reasons, many people use some type of digital board on a daily basis. A digital board or electronic whiteboard is a two-dimensional display space utilizing digital design. In contrast to traditional whiteboards, where physical media like markers are used to construct content, digital boards typically involve a stylus or other tool for users to create digital writing, drawings, or designs. Digital boards can be linked to other remote display screens, to provide interactive displays across many different physical locations.

Digital board software is helpful for a number of applications including note taking, drawing, image manipulation, presentation creation, and so forth. In today's growing digitally-prompted productivity, it is desirable to have a device with a touch-sensitive display that enables efficient mode switching by performing gestures on the touch-sensitive display to minimize work flow interruption and maximize time efficiency.

Most digital board software is used by manipulating a cursor on a computer. Currently, people use at least one digital board software program in combination with some type of touch-sensitive display. Touch-sensitive display technologies and various digital touch pads exist using a variety of forms and methods such as: resistive, capacitive, surface acoustic wave, infrared, and pressure sensitive liquid crystal display ("LCD") technologies, the implementation of which is apparent to one of ordinary skill in the art.

A number of digital board software programs exist including, but not limited to, Microsoft Paint, Microsoft Ink, PhotoShop, Smart Notebook, and Promethean ActiveInspire. However, switching modes in these programs typically requires a user to select a first button on a user interface to activate a first mode and subsequently select a second button on the user interface to activate a second mode. Mode switching, for example from an object selection mode to a freehand draw mode, necessitates more than one mouse click and/or finger or stylus taps. Consequently, having to use extra mouse or finger tap events to switch modes frequently becomes cumbersome and inconvenient to a user's workflow.

In light of these challenges in the field, there exists a need for improved digital board software that facilitates switching between functions in a mixed mode digital board system, and that makes use of the digital board easier, intuitive, and expedient. This need has remained heretofore unsatisfied.

SUMMARY OF THE INVENTION

The present invention overcomes these and other deficiencies of the prior art by providing a mixed mode digital board software that enables the switching between modes using minimal effort. For example, the invention enables easy and efficient mode switching between different functions using simple gestures with a digital board without disrupting workflow.

In an embodiment of the invention, a digital board system comprises a method for gesture-based transitions for interacting with a digital whiteboard, the method comprising the steps of receiving information relating to a first pointer down event; receiving information relating to a first pointer up event; comparing the information relating to the pointer down event to the information relating to the pointer up event; and transitioning from a first interactive mode to a second interactive mode based on the comparison. In another embodiment, the digital board system further performs the steps of receiving information relating to a second pointer down event; receiving information relating to a second pointer up event; comparing the information relating to the first pointer down event to the information relating to the second pointer down event; and comparing the information relating to the first pointer up event to the information relating to the second pointer up event; wherein the transition is further based on the comparison between the first pointer down event and the second pointer down event and the comparison between the first pointer up event and the second pointer up event. In another embodiment, the digital whiteboard system comprises a touch-sensitive display. In another embodiment, the first pointer down event and the first pointer up event are inputted by a pointing device, wherein the pointing device is a mouse, a digital pen, a stylus, a keyboard, or a user's finger. In another embodiment, the first interactive mode is an object creation mode, an object selection mode, a lasso selection mode, an object transition mode, or a digital canvas resizing mode; wherein the object creation mode enables a user to input objects displayed on the display, the object selection mode enables a user to select an object presented on the display, the lasso section mode allows a use to select multiple objects displayed on the digital canvas, the object transition mode enables a user to move, resize, manipulate, and/or scale selected objects, and the digital canvas resizing mode enables the digital canvas to be resized. In another embodiment, the information relating to the pointer down event comprises the time at which the pointer down event occurred, and the information relating to the pointer up event comprises the time at which the pointer up event occurred.

In another embodiment of the present invention, a digital whiteboard system comprises one or more processors and memory, communicatively coupled to the one or more processors, storing executable instructions that, when executed by the one or more processors, cause the one or more processors to perform acts comprising: identifying a pointer down event inputted by a user; identifying a pointer up event inputted by the user; comparing the pointer down event to the pointer up event; and transitioning, from a first interactive mode to a second interactive mode based on the comparison. In another exemplary embodiment, the digital whiteboard system further performs the steps of identifying a second pointer down event inputted by the user; identifying a second pointer up event inputted by the user; and comparing the pointer down event to the second pointer down event. In another embodiment, digital board system further comprises a touch-sensitive display. In another embodiment, the pointer down event and the pointer up event are inputted by a pointing device, wherein the pointing device is a mouse, a digital pen, a stylus, a keyboard, or a user's finger. In another embodiment, the first interactive mode is an object creation mode, an object selection mode, a lasso selection mode, an object transition mode, or a digital canvas resizing mode; wherein the object creation mode enables a user to input objects displayed on the display, the object selection mode enables the user to select an object displayed on the display, the lasso section mode allows the user to select multiple objects displayed on the display, the object transition mode enables the user to move, resize, manipulate, and/or scale selected objects, and the digital canvas resizing mode enables the digital canvas to be resized. The present invention is a low-cost, efficient, and dynamic digital board application that can use gestures to switch between available modes.

The foregoing, and other features and advantages of the invention, will be apparent from the following, more particular description of the preferred embodiments of the invention, and the accompanying drawings.

BRIEF DESCRIPTION OF THE DRAWINGS

For a more complete understanding of the present invention, the objects and advantages thereof, reference is now made to the ensuing descriptions taken in connections with the accompanying drawings described as follows.

Figure 1:
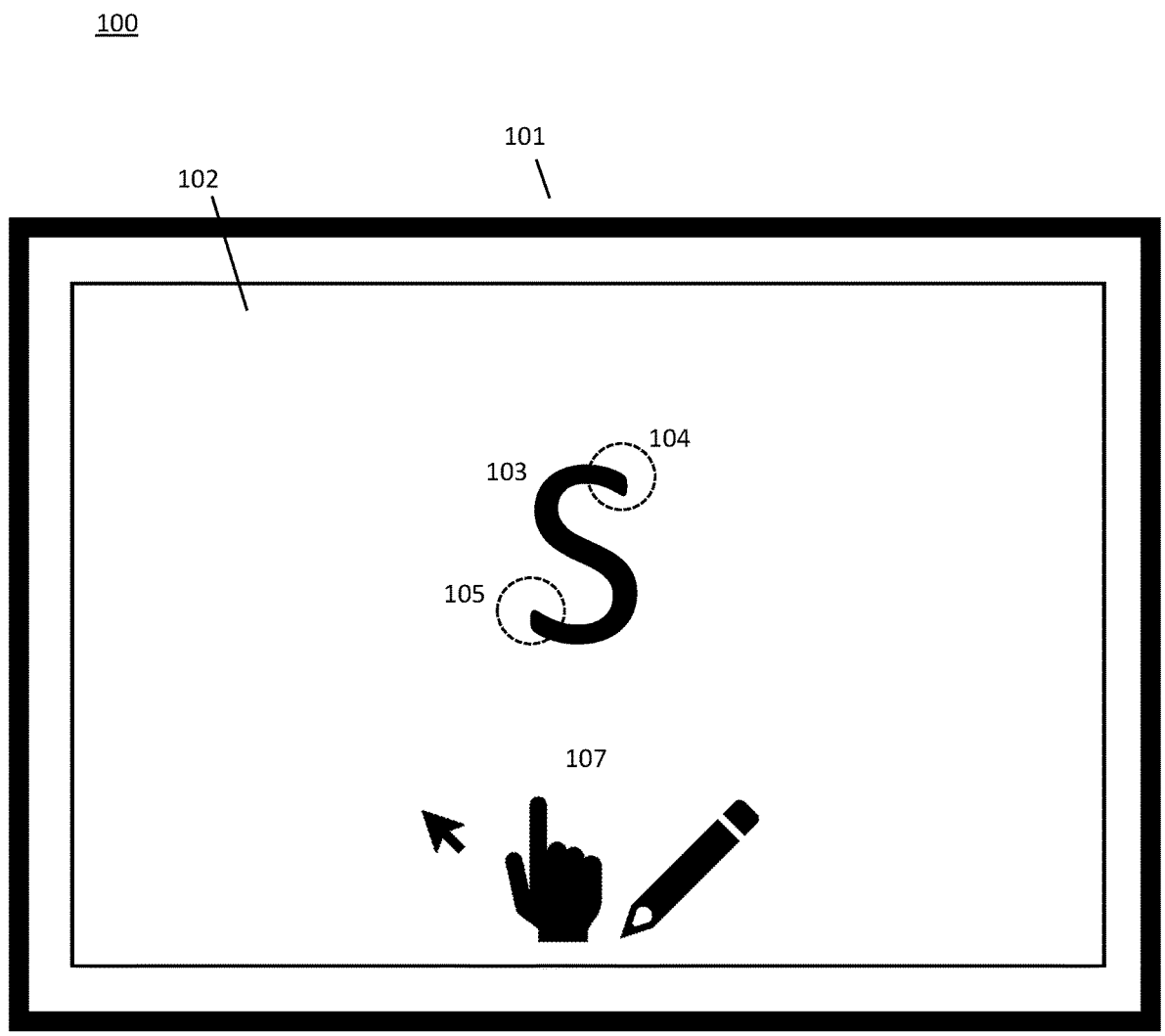
FIG. 1 illustrates a user using digital board software in object creation mode.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EMBODIMENTS

Further features and advantages of the invention, as well as the structure and operation of various embodiments of the invention, are described in detail below with reference to the accompanying FIGS. 1-4.

The present invention provides an improved technique to switch between modes on a digital board efficiently using simple gestures. For example, various modes include, but are not limited to, a freehand object creation mode and an objection selection mode, the implementation of which are apparent to one of ordinary skill in the art.

According to an embodiment of the invention, a digital board system comprises a computer, a touch-sensing display as a data input/output, and digital board software executed by the computer. A digital board system can be a standalone system integrated together as a single device or a multicomponent system where the computer is separate from the display. A digital board system can be coupled to a computer network for data communications to other computers and even other digital board systems. A digital board system can also take the form of a mobile device such as a tablet, laptop, or smartphone. Digital board software utilizes discreet modes to facilitate object creation versus object manipulation. A user applying pressure to the touch-sensing display is able to interact with the digital board software. In the present invention, the user is able to easily switch between these different modes by using simple gestures.

The touch-sensing display comprises a touchscreen, the implementation and identification of which is apparent to one of ordinary skill in the art, and a display. Exemplary displays include electroluminescent ("ELD") displays, liquid crystal display ("LCD"), light-emitting diode ("LED") backlit LCD, thin-film transistor ("TFT") LCD, light-emitting diode ("LED") displays, OLED displays, AMOLED displays, plasma ("PDP") display, and quantum dot ("QLED") displays. The touchscreen is capable of sensing a user's finger or fingers, a stylus, and/or an electronic/digital pen.

The digital board software presents a digital canvas on the display. A digital canvas is the area on a display on which a user can draw, write, annotate, and/or manipulate objects, among other actions. The digital canvas may be presented in the entire portion of visible area of the display or in a portion thereof such as a display window. Additionally, multiple digital canvases can be presented on a single display. A single digital canvas can be presented on multiple displays in whole or in part. For example, a single digital canvas can be such that a portion thereof is presented on a first display and the remainder is presented on a second display, i.e., a single digital canvas is extended across two or more displays. Additionally, the digital canvas can be resized. In such embodiments, the digital canvas is resized by extending or collapsing a side or corner of the digital canvas display window, the implementation of which is apparent to one of ordinary skill in the art. The digital canvas can also be extended by, for example, the gesture-based methodologies and techniques described herein. The digital canvas can also be resized by scaling the perimeter such that the aspect ratio between the width and the height remain constant.

An object is a graphical representation of data stored on a computer and/or within the digital board system. For example, objects include, but are not limited to, alphanumeric characters, lines, shapes, and/or images displayed on the display. Objects also include pictures, sounds, and movies, or other multimedia elements or information. A user can manipulate an object on the display using various modes that are user-selectable depending on the user's gesture when inputting information into the display, exemplary methodologies of which are described herein.

The present invention implements a pointing device. A pointing device allows the user to draw, add, annotate, or otherwise manipulate objects presented on the display. Such pointing devices include, but are not limited to, a user's hand or finger, and/or a keyboard. Exemplary pointing devices include motion-tracking pointing devices such as a computer mouse, a trackball, a joystick, a pointing stick, and other devices that allow the user to interact with and manipulate objects using gesture recognition and pointing through the use of an accelerometer and/or optical sensing technology. Exemplary pointing devices also include, but are not limited to, position-tracking pointing devices such as a graphics tablet, a stylus, an electronic/digital pen, a touchpad, and a touchscreen. Exemplary pointing devices further include, but are not limited to, an isometric joystick. Certain user events are processed and/or recorded by the present invention. For example, a pointer down event refers an event at which the pointing device initially interacts with the display. For example, when a user is using his or her finger to draw on the display, the pointer down event refers to the time and/or location at which the user first touches his or her finger to the display. Similarly, a pointer up event refers to the time and/or location at which the user discontinues the pointing device's interaction with the display. Continuing in the previous example, the pointer up event refers to the time and/or location at which the user removes his or her finger from the display.

The pointer down and pointer up events are associated with various types of information. For example, these events are associated with a timestamp as determined by the computer or by an external source. The pointer events can also include positional information as to where the event occurred in the digital canvas. For example, the pointer event positional information can have associated X-Y cartesian coordinates pertaining to the event's two-dimensional location on the display, the digital canvas, or both. The pointer event positional information may also have associated pixel information pertaining to the pixel or pixels at which the event occurred. Such positional information may also include the relative distance between a pointer down event and a pointer up event. The pointer down and pointer up events may also include information relating to the pointing device's interaction with the display, for example, the amount of force/pressure the user exerted on the display and/or digital canvas while interacting with it. The pointer down and pointer up events may also include the speed, velocity, and/or acceleration information derived from the user's interaction with the digital canvas. For example, when a user uses his or her finger to draw a line on the digital canvas, the color of the line may vary depending on the speed, velocity, or acceleration of the pointer relative to the digital canvas and the width of the line may vary with the amount of pressure the user applies to the digital canvas. Additionally, the pointer up and pointer down event information may be gathered from the display, the digital canvas, the pointing device, or an external device. For example, a stylus comprising accelerometers gathers sufficient positional information to allow the digital board software to determine the location on the display and/or digital canvas where the pointing device is interacting. In another example, the pointer event information can be received from an external device. In such an example, a camera or other imaging device may be used to record the pointing device as it interacts with the display and/or digital canvas. The digital board software can then extrapolate the pointing device's event information from the imagery.

The pointer up and pointer down events are also used to determine whether the user has performed a "tap" on the display. For example, if the amount time between the pointer down event and the pointer up event is below a predetermined threshold, the software determines the user initiated a single-finger tap on the display. In such an example, if the pointer down and pointer up events transpired within, for example, 250 milliseconds, the software determines the user "tapped" the display and accordingly implements the interactive mode associated with a single-finger tap. Thresholds smaller or larger than 250 milliseconds may be used without departing from the contemplated embodiments. Further, the system may dynamically adjust such threshold values either on its own or in a user-configurable format. In another example, the digital board software may examine the distance between the pointer down and pointer up events and, if the distance is lower than a predetermined threshold, the software implements the selection mode. In such an example, if the distance between the pointer down and pointer up events is, for example, 2 pixels, the software implements the associated interactive mode. Further, the system may dynamically adjust such threshold values either on its own or in a user-configurable format.

The pointer up and pointer down events are also used to determine whether the user initiated a multipointer event. Such multipointer events include, but are not limited to, a two-finger tap and a three-finger tap. In determining whether the user initiated a two-finger tap, the digital board system detects a first pointer down event, a second pointer down event, a first pointer up event, and a second pointer up event. The software compares, for example, the time and/or distance between the first pointer down event and the second pointer down event. If the pointer down events occurred within a predetermined threshold of time relative to one another, for example 300 milliseconds, the software will determine the user initiated a two-finger tap. Thresholds smaller or larger than 300 milliseconds may be used without departing form the contemplated embodiments. The system may dynamically adjust such threshold values either on its own or in a user-configurable format. The software may also perform a similar comparison to the first pointer up event and the second pointer up event in determining whether a two-finger tap occurred. In some embodiments, the digital board software compares the distance between the first pointer down event and the second pointer down event to determine whether a two-finger tap has occurred. In such an embodiment, the software determines a two-finger tap has occurred when the distance between the first pointer down event and the second pointer down event is within a predetermined threshold, for example, ten pixels. The system may employ smaller or larger thresholds, which the system may dynamically adjust such threshold values either on its own or in a user-configurable format, without departing from the contemplated embodiments. Additionally, the software may also compare the pointer up events to the pointer down events. For example, the software may determine the average distance and/or time between the two pointer down events and compare it to the correlating averages of the pointer up events. Once the digital board software determines which, if any of the multipointer events has occurred, the software may then utilize that information to determine whether and to which mode it should transition, if at all.

The digital board system implements a selection mode that allows the user to select one or more objects displayed on the display by performing associated gestures. The digital board software determines whether to implement the selection mode based on information gathered from the system such as, for example, pointer down and pointer up information, as described herein. For example, the digital board system can be configured such that it will implement the selection mode with it detects a single-finger tap, the detection of which is described herein. Once the software has determined a single-finger tap has occurred, the system selects the object or objects intersecting the location of the tap event. The software may also select the objects that are within a predetermined distance from the location at which the tap occurred by, for example, two pixels. Although a two-pixel threshold is discussed any threshold value can be used without departing from the contemplated embodiments. The system may dynamically adjust such threshold values either on its own or in a user-configurable format. In another embodiment, the digital board system can be configured such that the selection mode will be implemented when a multipointer event is detected, for example, a two-finger tap.

The digital board system implements an object creation mode that allows the user is able to draw on the display. The digital board software employs the object creation mode depending on information gathered. For example, the digital board software can be configured to transition to the object creation mode based the pointer event positional information. In such an example, the digital board software determines the distance between a pointer down event and a pointer up event. If the distance is greater than a predetermined threshold, the software will employ the object creation mode. Additionally, the digital board software determines that the user intends to use the object creation mode if the amount of time between a pointer down event and a pointer up event is greater than a predetermined threshold, for example, 250 milliseconds. Although a threshold of 250 milliseconds is discussed, any threshold may be used without departing from the contemplated embodiments. Once the digital board software implements the object creation mode, it records the path the taken between the pointer down event and the pointer up event and presents that path in graphical form on the display. The system need not wait until the pointer up event to register before it presents the path, i.e., the graphical representation of the path is displayed as the user draws in real time or near-real time.

The digital board system implements a lasso mode that allows the user to select a plurality of objects appearing within a user-defined area of the display. The system may be configured, for example, to transition to the lasso mode when it detects a bounded or semi-bounded area traced by a two-finger path. In such an embodiment, the digital board software detects the traced two-finger path based on multiple pointer down events and multiple pointer up events. In other embodiments, the system may be configured to transition to the lasso mode based other pointer event information including, but not limited to, the number of pointer down events, the number of pointer up events, the pressure detected in the pointer down and/or pointer up events, and/or the number of taps registered.

The digital board system implements a resizing mode that reconfigures the bounds of the digital canvas based on the system's configuration. The digital board software transitions to the resizing mode once, for example, the software detects that the user is drawing within a predetermined distance from the edge of the digital canvas. This ensures the user will not run out of area while utilizing the object creation mode. In some embodiments, the resizing mode is used in conjunction with the object creation mode, wherein the software automatically resizes the digital canvas in real time or near-real time so that the user does not have to stop drawing while the digital canvas is resized.

FIG. 1 illustrates a two-dimensional ("2D") schematic of a digital board system 100 in an object creation mode, according to an embodiment of the invention. Specifically, the digital board system 100 comprises a display 101, a digital canvas 102, an object 103 (the "S"), a pointer down event 104, and a pointer up event 105. The digital canvas 102 may comprise all or less than all of the display's 101 area display area. A user uses his or her hand to interact with the digital board software through the display's 101 touch sensing technology. The digital board software comprises two modes, an object creation mode and a selection mode. The object creation mode allows the user to draw or write on the digital canvas 102 using his or her finger or a stylus. To draw on the digital canvas, the user applies pressure to the surface of the display 101 within the area of the digital canvas 102. To draw the "S," the user applies a pressure at the pointer down event 104 and then proceeds to trace the shape of the letter "S" using his or her hand until reaching the pointer up event 105, at which point the user lifts his or her hand from the display 101.

Figure 2A:
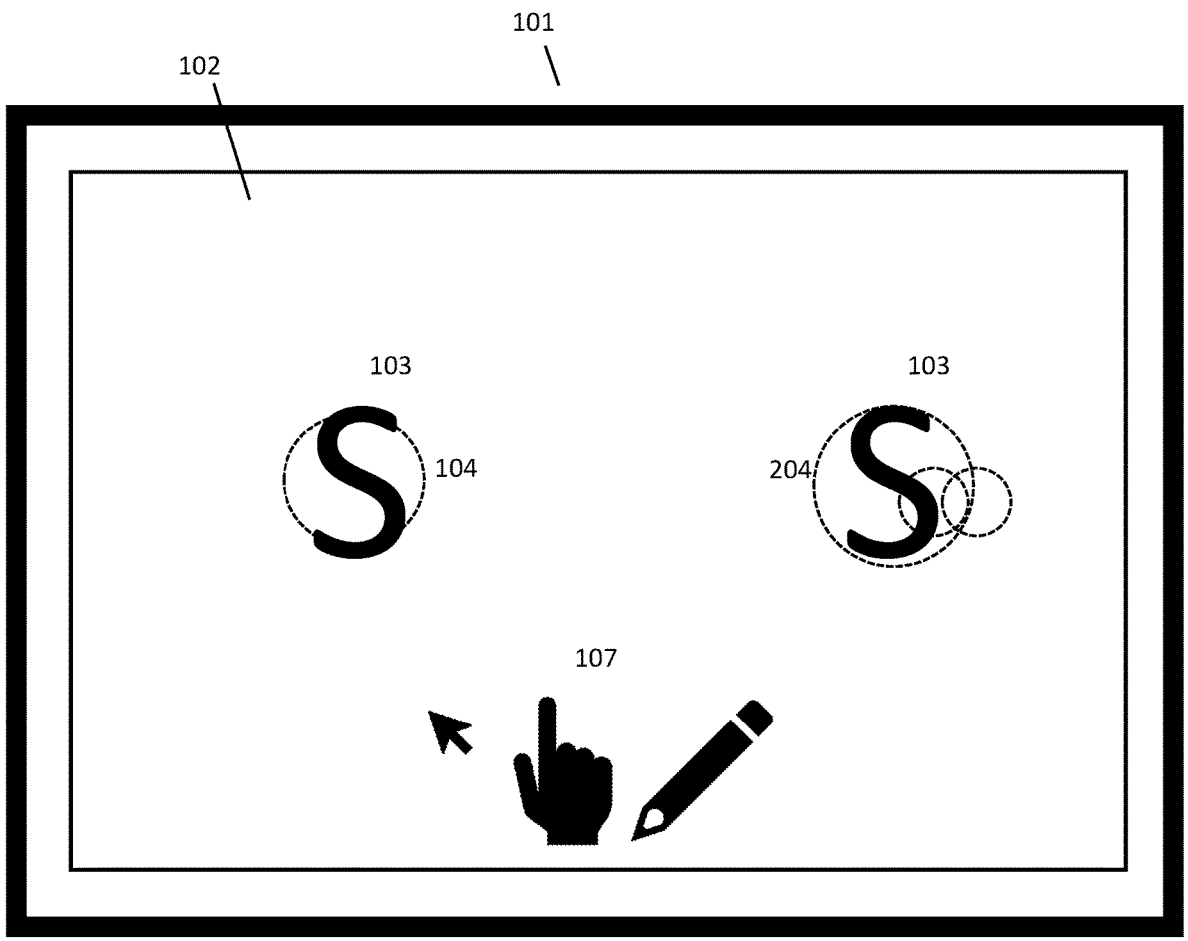
FIG. 2A illustrates a user using digital board software switching from an object creation mode to a selection mode.

FIG. 2A illustrates the digital board system 100 in a selection mode according to an embodiment of the invention. Specifically, the digital board system 100 comprises a display 101, a digital canvas 102, an object 103, and a pointer down event 104 (e.g., a single finger(s) tap). The pointer down event 104 can be inputted by the user tapping one or more fingers on the display 101. Selection mode allows the user to select object 103, which has been drawn or inputted onto the digital canvas 102. The user is able to switch from object creation mode to selection mode with a gesture. For example, the user performing a single-finger tap using his or her finger 107 such that the tap location occurs within the area bounded by the object 103, or within a predetermined distance therefrom, as described herein. However, other gestures may be used, as shown and described herein. A finger tap may immediately switch to selection mode and select the tapped object 103. Once selected, the user is now able to manipulate the selected object 103 in any way allowed by the selection mode. For example, the user may enlarge, rotate, scale, replace, transpose, and/or change the color of the selected object 103.

The user is free to begin drawing at any time and the digital board system 100 will immediately transition back to the object creation mode. For example, the digital board software recognizes that the user intends to transition from the object creation mode to the selection mode as described herein. The digital board software is able to differentiate between different types of inputs using, for example, the time, interval, and threshold of the user's pressure on the touch-sensing surface of the display 101.

Figure 2B:
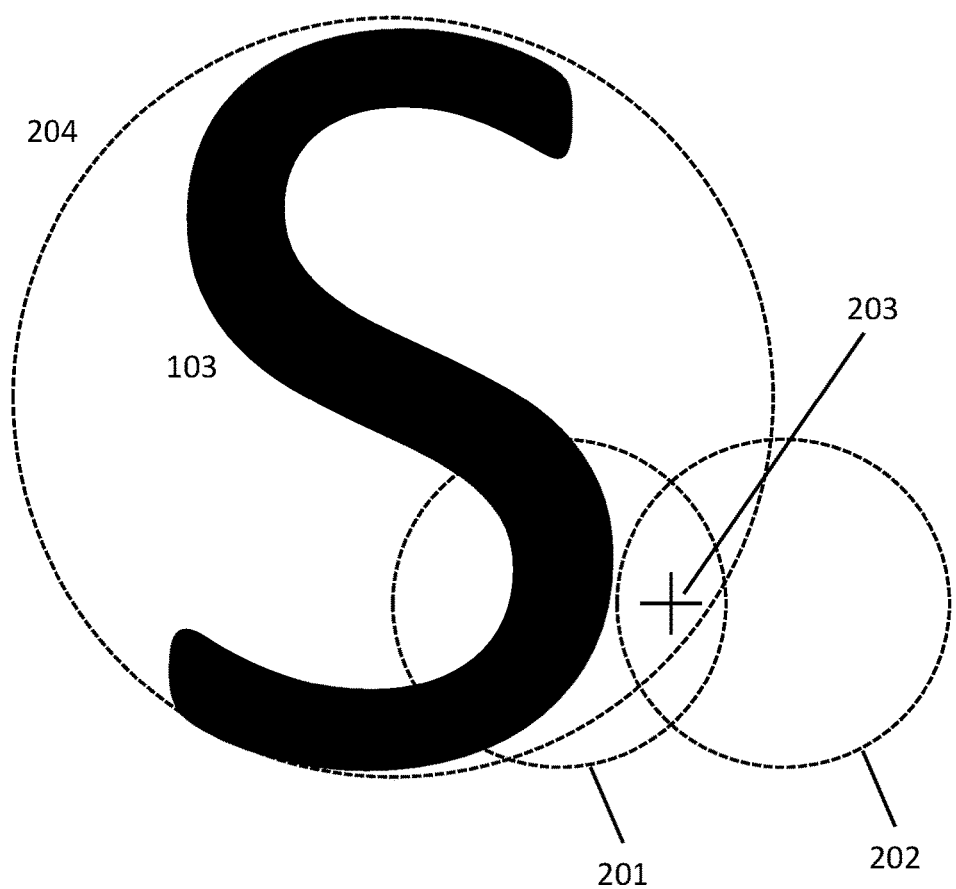
FIG. 2B illustrates a detailed view of a two-finger tap selecting an object.

FIG. 2B illustrates a user employing a two finger tap to transition to the selection mode. In this embodiment, the digital board software detects a first pointer down event 201 and a second pointer down event 202. The software determines the average distance between the geographic center 203 of the first pointer down event 201 and second pointer down event 202. When the center 203 falls within the predetermined selection area 204 of the object 103, the system transitions to the section mode and selects the object 103.

Figure 3:
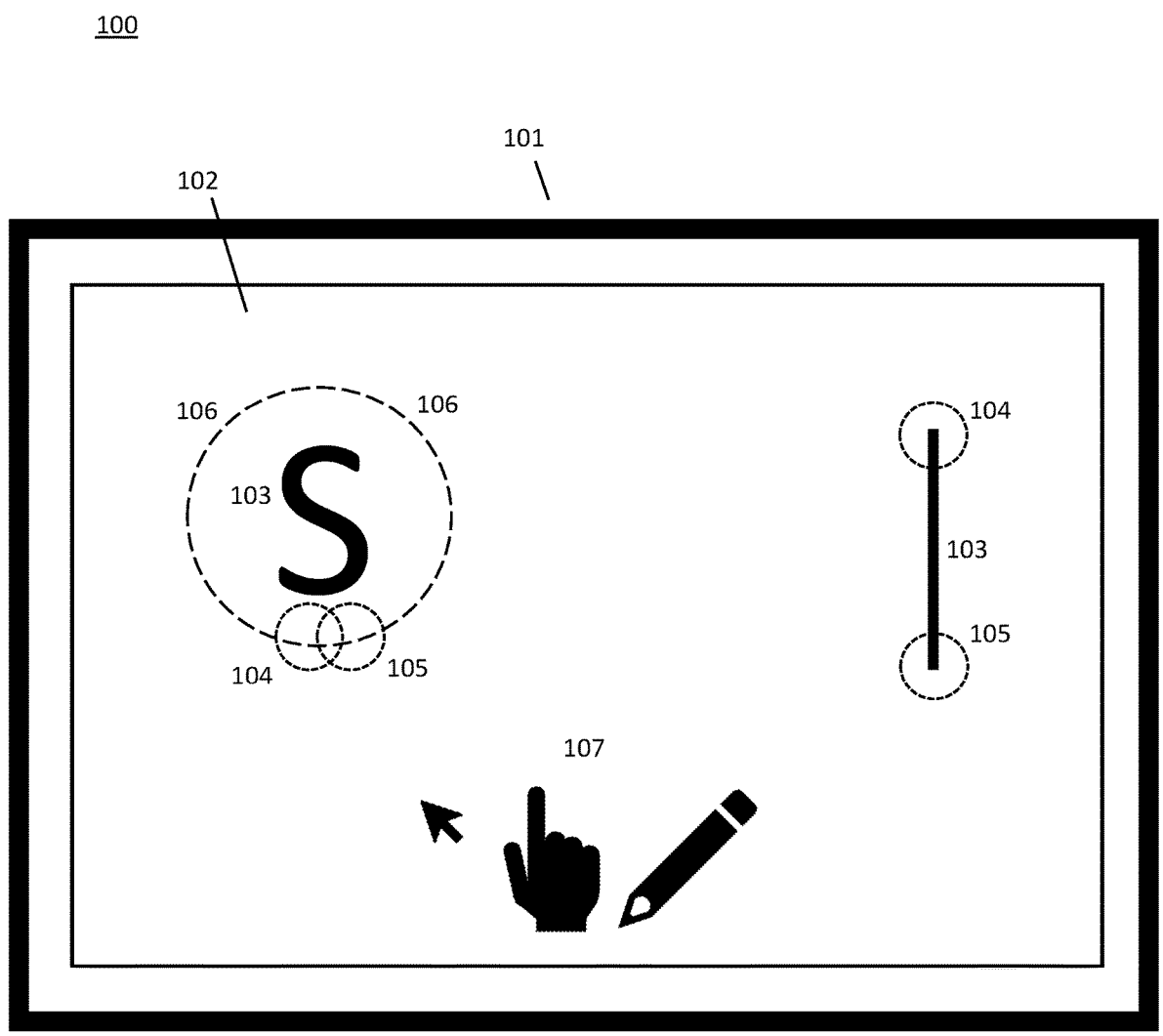
FIG. 3 illustrates a user using digital board software switching from an object creation mode to a selection mode.

FIG. 3 illustrates a user using digital board software transitioning from the object creation mode to the lasso mode. Specifically, the digital board system 100 comprises a display 101, a digital canvas 102, an object 103 (e.g., the "S" and/or the line), a pointer down event 104, a pointer up event 105, a lasso 106, and a pointer 107. The pointing device 307 may be embodied by, for example, a mouse curser, a user's finger, or an electronic pen interacting with the digital canvas 102.

In an exemplary lasso mode, a user is able to lasso a section of the digital canvas by tracing a section with the cursor 307. The digital board software transitions to the lasso mode when, for example, the system detects a lasso boundary 106 that wholly or partially encircles an object 103. Although only one object 103 is shown, the digital board software will select any number of objects displayed within the lasso boundary 106. The user is now able to manipulate the selected objects 103 in any way allowed by the selection mode. The user is free to begin drawing at any time and the digital board will immediately transition back to object creation mode once the object creation mode is detected, as described herein.

Figure 4A:
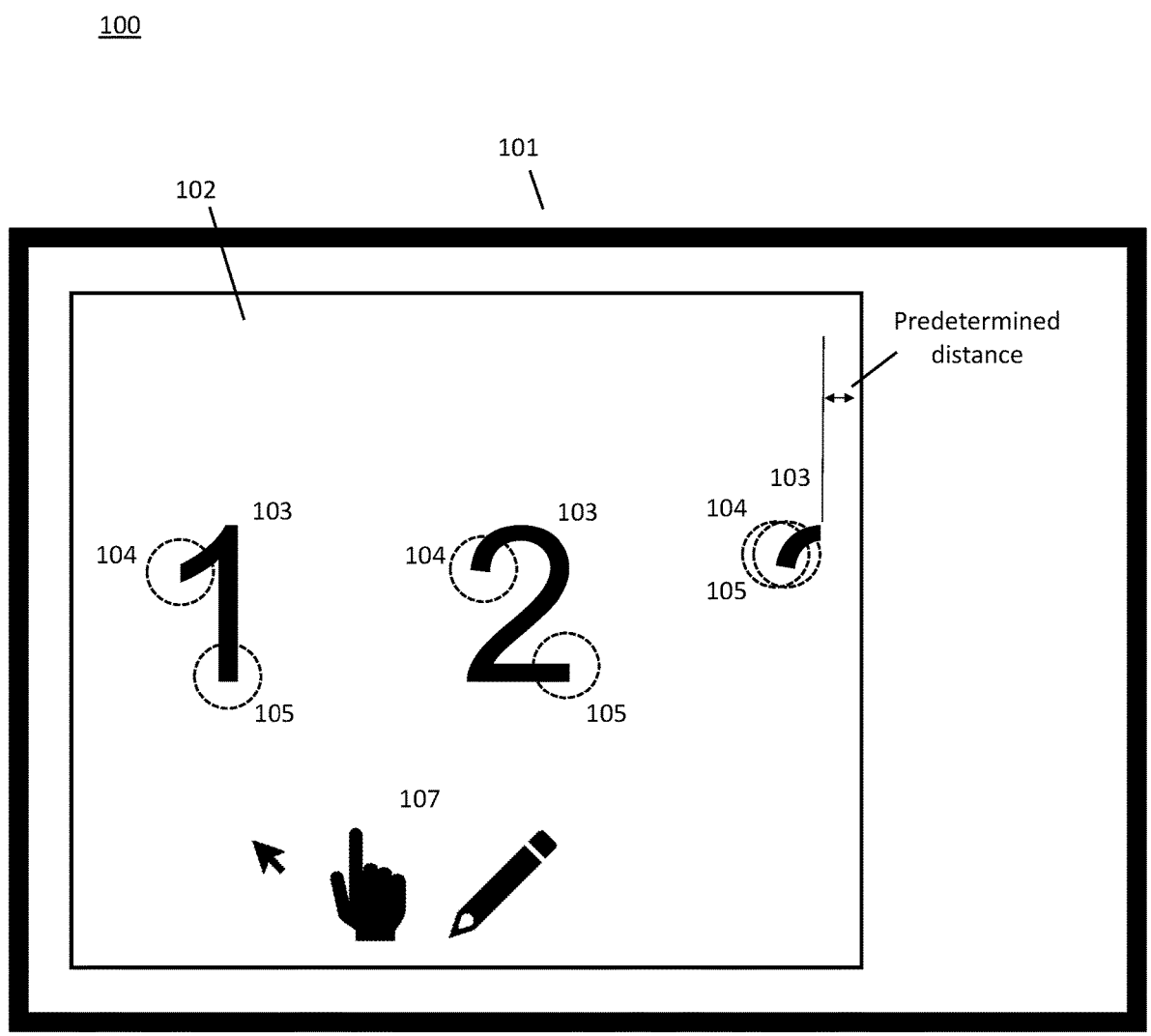
FIGS. 4A and 4B illustrates a user using digital board software in object creation mode and the digital board software switching from an object creation mode to a resizing mode.
Figure 4B:
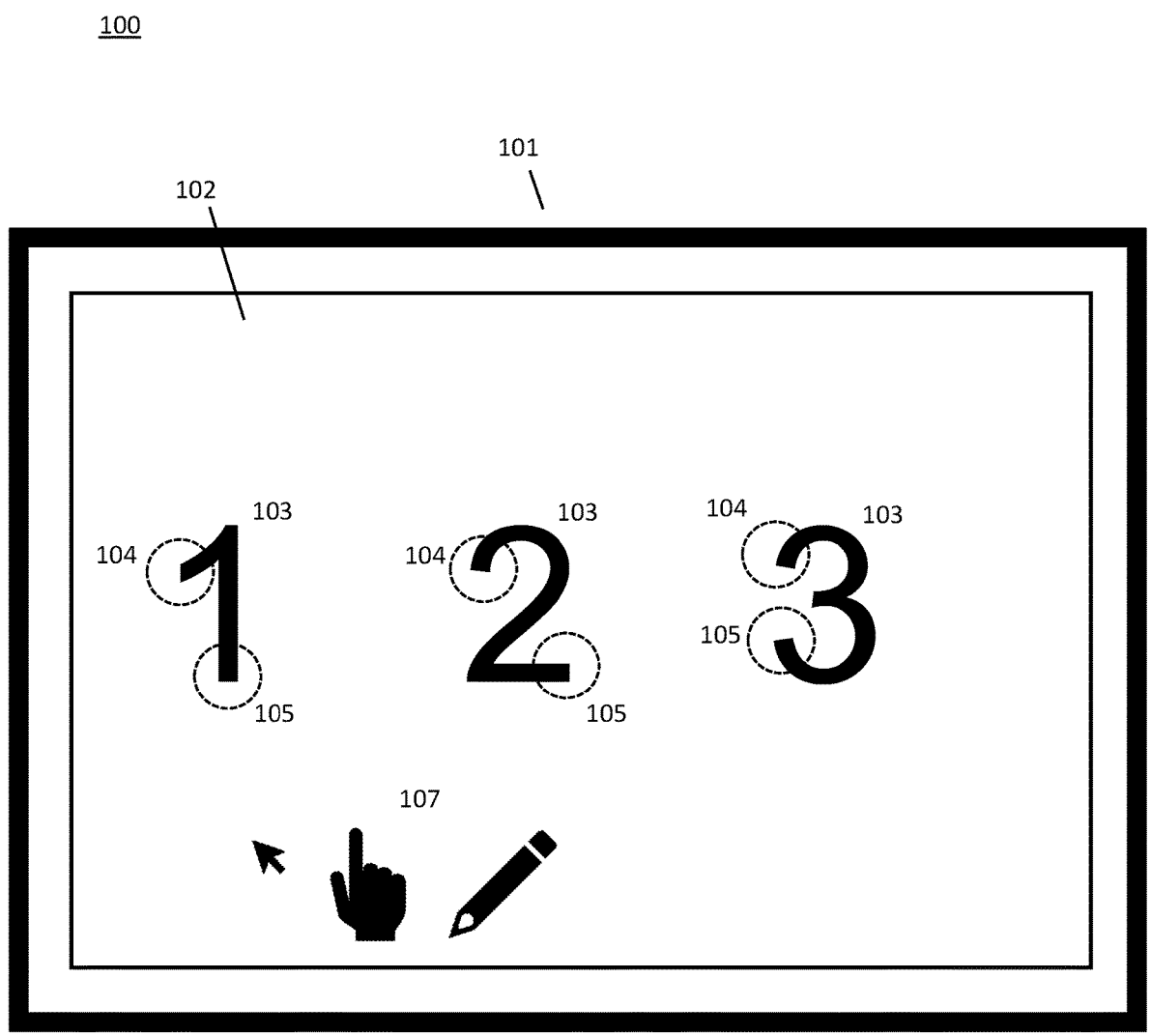

FIG. 4A illustrates a user using digital board software transitioning from an object creation mode to a resizing mode. Specifically, the digital board comprises a display 101, a digital canvas 102, objects 303, a pointer down event 104, a pointer up event 105, and pointers 107. In this embodiment, the digital board software comprises an object creation mode, resizing mode, digital canvas 102, and pointer 107. The user may wish to expand the window size of the digital canvas 102 in real time while drawing. The user can use a gesture to cause the digital board system 100 to enter the resizing mode, which increases the available drawing area. For example, the gesture may be drawing within a predetermined distance from the edge of the digital canvas 102. However, any similar gesture may be used, as shown and described herein. If the user draws within the predetermined distance from the edge of the digital canvas 102, the digital board software will automatically resize the digital canvas 102. In such an embodiment, the user is not required to click resizing mode. The user can continue to draw without interruption and use gestures to cause the digital canvas 102 to resize. The predetermined distance from the edge of the digital canvas can be any distance, including zero, without departing from the contemplated embodiments.

In some embodiments, as the user draws in object creation mode, the digital board software registers each pointer down event 104 and each pointer up event 105. The digital board software may determine the distance between the pointer up event 105 and the edge of the digital canvas 102. If the distance between the pointer up event 105 value and the edge of the digital canvas 102 is smaller than a predetermined edge threshold, the digital board software enters resizing mode and resizes the digital canvas 102. The digital canvas 102 can be resized by extending its boundaries and/or by scaling the overall size of it. The distance and scaling of the edge threshold can be different based on the screen size or different drawing behaviors. In other embodiments, in resizing mode, if the digital board software determines that there is some distance between the digital canvas 102 boundary and the tablet computer boundary, the digital canvas may increase to a larger width. The digital board software increases the width based on where the position up value is located. For example, in FIG. 4B, the pointer up event 105 is located closest to the right most digital canvas 102 boundary. The user can immediately begin drawing again to enter into object creation mode. In another embodiment, in resizing mode, the digital board software increases the width and the height based on the location of the pointer up value.

In another embodiment, it may not be possible for the digital canvas 102 to expand its boundaries. In such an embodiment, the digital board software scales the digital canvas 102 down. When this happens, all objects 103 on the digital canvas 102 appear smaller relative to the digital canvas 102 area. When the digital canvas scales 102 down, the digital board software will reduce the height and/or width, of the objects 103 on the digital canvas 102. This will give the user more room to draw on the digital canvas 102. In some embodiments, the digital board software comprises a predetermined limitation value for how much the digital canvas 102 can scaled. The predetermined limitation value may relate to the minimum size of the objects 103 on the digital canvas 102 compared to their original size. In various examples, a default limitation value is approximately one-half of the original size, a value smaller than or larger than one-half the original size can be used without departing from the contemplated embodiments.

In another embodiment, the digital canvas reaches the scale down limitation value. When the scale down limitation is reached, the digital board software moves all of the objects 103 in the horizontal and/or vertical directions on the digital canvas 102 to allow for more space. For example, if the user has been using the right side of the digital canvas 102, the digital board software will move all the objects 103 to the left. Some of the objects 103 will be outside of the digital canvas 102 boundary and the digital board software will store the objects 103 in the software's memory.

The invention has been described herein using specific embodiments for illustrative purposes only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following drawings and claims.

We claim:

1. A method for gesture-based transitions for interacting with a digital whiteboard, the method comprising the steps of:

receiving information relating to a first pointer down event;

receiving information relating to a first pointer up event;

comparing the information relating to the pointer down event to the information relating to the pointer up event; and transitioning from a first interactive mode to a second interactive mode based on the comparison;

wherein the information relating to the first pointer down event comprises the location at which the first pointer down event occurred, and the information relating to the first pointer up event comprises the location at which the first pointer up event occurred and a path traversed between the first pointer down event and the first pointer up event on the digital whiteboard.

2. The method of claim 1, further comprising the steps of:
receiving information relating to a second pointer down event;
receiving information relating to a second pointer up event;
comparing the information relating to the first pointer down event to the information relating to the second pointer down event; and
comparing the information relating to the first pointer up event to the information relating to the second pointer up event;
wherein the information relating to the second pointer down event comprises the location at which the second pointer down event occurred, and the information relating to the second pointer up event comprises the location at which the second pointer up event occurred and a path traversed between the second pointer down event and the second pointer up event on the digital whiteboard; and
wherein the transition is further based on the comparison between the first pointer down event and the second pointer down event and the comparison between the first pointer up event and the second pointer up event.

3. The method of claim 1 further comprising a touch-sensitive display configured to receive the first pointer down event and the first pointer up event.

4. The method of claim 1, wherein the first pointer down event and the first pointer up event are inputted by a pointing device, wherein the pointing device is a mouse, a digital pen, a stylus, a keyboard, or a user's finger.

5. The method of claim 3, wherein the first interactive mode is an object creation mode, an object selection mode, a lasso selection mode, an object transition mode, or a digital canvas resizing mode; wherein the object creation mode enables a user to input objects presented on the touch-sensitive display, the object selection enables a user to select an object presented on the touch-sensitive display, the lasso section mode allows a user to select multiple objects presented on the touch-sensitive display, the object transition mode enables a user to move, resize, manipulate, and/or scale selected objects, and the digital canvas resizing mode enables the user to resize a digital canvas presented on the touch-sensitive display.

6. The method of claim 1, wherein the information relating to the pointer down event comprises the time at which the pointer down event occurred, and the information relating to the pointer up event comprises the time at which the pointer up event occurred.

7. A system comprising:
one or more processors; and
memory, communicatively coupled to the one or more processors, storing executable instructions that, when executed by the one or more processors, cause the one or more processors to perform acts comprising:
identifying a pointer down event inputted by a user onto a display;
identifying a pointer up event inputted by the user onto the display;
comparing the pointer down event to the pointer up event; and
transitioning from a first interactive mode to a second interactive mode based on the comparison;
wherein the information relating to the pointer down event comprises the location at which the pointer down event occurred, and the information relating to the pointer up event comprises the location at which the pointer up event occurred and a path traversed between the pointer down event and the pointer up event on the digital whiteboard.

8. The system of claim 7, wherein the executable instructions further cause the one or more processors to perform acts comprising:
identifying a second pointer down event inputted by the user onto the display;
identifying a second pointer up event inputted by the user onto the display; and
comparing the pointer down event to the second pointer down event.

9. The system of claim 7, further comprising a touch-sensitive display configured to receive the pointer down event and the pointer up event.

10. The system of claim 7, wherein the pointer down event and the pointer up event are inputted by a pointing device, wherein the pointing device is a mouse, a digital pen, a stylus, a keyboard, or a user's finger.

11. The system of claim 9, wherein the first interactive mode is an object creation mode, an object selection mode, a lasso selection mode, an object transition mode, or a digital canvas resizing mode; wherein the object creation mode enables a user to input objects displayed on the touch-sensitive display, the object selection enables the user to select an object displayed on the touch-sensitive display, the lasso section mode allows the user to select multiple objects displayed on the touch-sensitive display, the object transition mode enables the user to move, resize, manipulate, and/or scale selected objects, and the digital canvas resizing mode enables the user to resize a digital canvas presented on the touch-sensitive display.

* * * * *